US012703477B2

(12) United States Patent
Regev

(10) Patent No.: US 12,703,477 B2
(45) Date of Patent: Aug. 11, 2026

(54) FOLDED WING MULTI ROTOR

(71) Applicant: Colugo Systems LTD., Yavne (IL)

(72) Inventor: Amit Regev, Moshav Bitzaron (IL)

(73) Assignee: Colugo Systems LTD., Yavne (IL)

( * ) Notice: Subject to any disclaimer, the term of this patent is extended or adjusted under 35 U.S.C. 154(b) by 0 days.

(21) Appl. No.: 18/211,275

(22) Filed: Jun. 18, 2023

(65) Prior Publication Data

US 2024/0166260 A1 May 23, 2024

Related U.S. Application Data

(63) Continuation of application No. 16/485,583, filed as application No. PCT/IL2018/050244 on Mar. 5, 2018, now Pat. No. 11,358,642.

(30) Foreign Application Priority Data

Mar. 7, 2017 (IL) ......................................... 250996

(51) Int. Cl.

*B64C 3/54* (2006.01)
*B64C 29/00* (2006.01)
*B64U 10/13* (2023.01)
*B64U 10/25* (2023.01)
*B64U 30/12* (2023.01)
*B64C 3/30* (2006.01)

(52) U.S. Cl.

CPC .......... *B64C 3/546* (2013.01); *B64C 29/0025* (2013.01); *B64U 10/13* (2023.01); *B64U 10/25* (2023.01); *B64U 30/12* (2023.01); *B64C 3/30* (2013.01)

(58) Field of Classification Search

CPC ........ B64U 20/50; B64U 30/16; B64U 40/20; B64U 40/10; B64C 3/54; B64C 3/546; F42B 10/12; F42B 10/18

See application file for complete search history.

(56) References Cited

U.S. PATENT DOCUMENTS 7,762,500 B1 * 7/2010 Dhall ........................ B64C 3/56 244/45 R
9,254,916 B2 * 2/2016 Yang ....................... B64C 3/546
11,760,465 B2 * 9/2023 Newsam ................... B64C 3/56 244/218
2017/0305526 A1 * 10/2017 Thomassey ............ B64U 30/12

FOREIGN PATENT DOCUMENTS

WO WO-1988000152 A1 * 1/1988

* cited by examiner

*Primary Examiner* — Richard Green
(74) *Attorney, Agent, or Firm* — The Law Office of Joseph L. Felber

(57) ABSTRACT

A multirotor aircraft that includes a chassis, vertical rotors, foldable wings, and a means for deploying and folding the foldable wing. The foldable wing is attached to the chassis and the means for deploying and folding the foldable wing is designed to deploy and open the foldable wing from a folded and closed state to a deployed and opened state, and vice versa. The gravity center of the folded wing in a folded and closed state is near and close to the gravity center of the multirotor aircraft, and by that enabling to fold and close the foldable wing when hovering, landing and during takeoff and to deploy and open it when flying forward.

14 Claims, 7 Drawing Sheets

400
300
200
402
404
350
300

402

400
300
200
404
350
300

400

300
200
350
404
401
300

400
300
404
405
450
451
452
452
451
450
405
350
300

400
300
404
405
450
451
452
452
451
450
405
350
300

405
300
452
405
404
452
200
300
350

404
350
300
400

300
350

404
404
400

410
411
412
350
404

406
412
404
411
400
410

201
300

201
201
201
400

300
400
200
404

300
400
4023
4023
4023
4023

FOLDED WING MULTI ROTOR

TECHNICAL FIELD

The present invention refers to a multirotor aircraft with three or more rotors which equipped with a foldable wing which can fold or unfold during flight by an airborne actuator or mechanism or by the wind force during flight.

BACKGROUND ART

In recent years, a broad-based industry has emerged that engages in the development, manufacture, and use of aircraft able to take off vertically and then fly horizontally. These aircraft may be either manned or unmanned and have a variety of names, such as VTOL (vertical takeoff and landing) aircraft, multirotor aircraft, tilt aircraft, and more. Such aircraft are characterized by having several engines (propeller or jet) that enable vertical takeoff and landing of the aircraft. Once the aircraft is airborne, the orientation of the engines may be adjusted in order to propel the aircraft forward in horizontal flight. For the sake of the clarity, we shall, in the present patent application, refer to said aircraft as "multirotor aircraft". Multirotor aircraft can take off, hover, and fly horizontally using either propeller engines or jet engines. The aircraft is controlled and stabilized using sensors and a flight control computer that control and transmit commands to the aircraft's engines and propellers.

One advantage of multirotor aircraft is their ability to take off and land vertically, hover in the air, and even fly in the horizontal direction. One of the disadvantages of multirotor aircraft lies in the relatively short time they can remain airborne. This limitation stems from the fact that when the aircraft is in horizontal flight, some of the energy from the engines is utilized for its horizontal forward movement.

Therefore, certain models of multirotor aircraft include wings to enhance energy efficiency in horizontal flight. In certain models of multirotor aircraft equipped with wings, the engines are attached to the wings by a fixed connection, so that the angle between them is fixed, and rotary movement of the engines occurs simultaneously with wing rotation. In other models, the wing and engines are fixed in relation to the chassis. The disadvantage of the aforementioned aircraft in which engines and wing are interconnected by a fixed connection, comes into play both during takeoff and landing and when hovering. When the wings are vertical relative to the earth (with engines facing upwards, functioning as in a helicopter) and conditions are windy, drag and instability ensue. Similarly, in the case of aircraft in which both engines and the wing are connected to the chassis by a fixed connection, a negative lift and drag created on the wing during takeoff, hovering, and landing with either a rear wind or a side wind. This causes loss of energy (requiring increased engine operation) or worse, causes the aircraft to deviate from its vertical landing line or hovering point. This problem becomes especially severe when such aircraft is to be landed on the roof of a building, in which case a side wind at the precise moment of landing may divert the aircraft from its landing point.

We shall now summarize the problem that exists with the various models of winged multirotor aircraft: (a) multirotor aircraft that equipped with a wing fixed relative to the chassis: during horizontal flight, the wing functions as in a conventional aircraft. When hovering, during which the aircraft remains in place above a fixed point on the earth, or when landing, when the aircraft is also positioned vertically above a fixed point on the earth, and when conditions are not windy, no problem arises.

However, if a side wind, gusts of wind, or a rear wind occurs, the aircraft is shifted from the fixed point, and this poses a problem as previously mentioned. (b) In aircraft equipped with a wing that is fixed to the engines, in which the engines rotate together with the wing relative to the aircraft chassis: during horizontal flight, the aircraft functions as a conventional airplane. However, when hovering or landing, the engines face upward while the wings are directed vertically towards the ground; thus, any wind from any direction causes the aircraft to shift from said fixed point. In addition, it is impossible to control the disturbance, since moving the wing itself has an effect, creating a clash between the correcting of the engines and of the wings.

In addition, when the multirotor needs to hover in a certain point in a state of front wind, the wing creates a lift and for remaining in the same altitude the user should reduce the engines' thrust. When the engines' thrust is low, about less than 50 percent of their maximum thrust, it is hard to control the aircraft efficiently. The same problem occurs when landing vertically in a state of front wind. Also in this case the user should reduce the engines' thrust and low engines' thrust prevents good control of the vertical movement of the aircraft. In such situation the aircraft wobbles and the landing is hard and dragged. In fact all the controlled forces are directing up and to the sides and there are no forces directing down and if, obviously since the purpose of the aircraft is to overcome the gravity forces. Therefore if there is wind over the wing the forces directing up are much greater than the constant uncontrolled gravity force down, this is why it is hard to create good and steady control on the up and down vector and that is why reducing the wing lift and even eliminate it leaves the gravity force hence the multirotor weight and the motors at enough power to give sufficient control over the aircraft.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

Figure 1A:
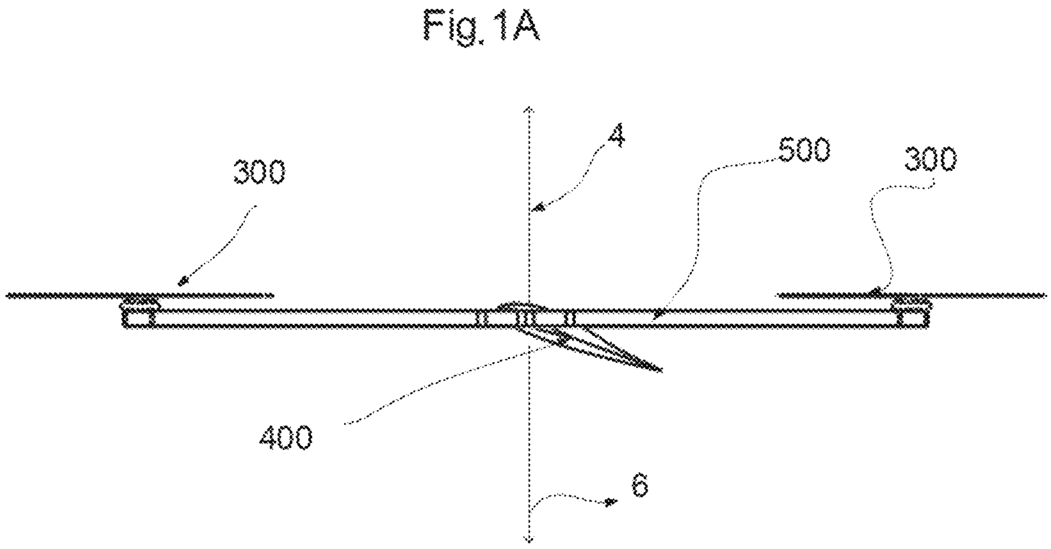
FIG. 1A depicts a multirotor aircraft in horizontal position and the force vectors acting on it.

The present invention refers to a multirotor aircraft with foldable wing, designed so that, on the one hand, wings may be used to enhance flight efficiency and save energy, and on the other hand, the problem that exists with multirotor aircraft equipped with wings that are attached to the chassis or engines of the aircraft is avoided.

A multirotor is a unique aircraft which as multiple source of thrust which are relatively small because they are many, so it is possible to spread them around away from the aircraft mass and by that clear space for wings which will not be affected from the thrusts sources and increase the momentum that those rotor or thrust create to overcome the wings drag momentum which is very strong but concentrated in the middle of the aircraft.

While hovering or during takeoff and landing in short called VTOL, the atmospheric wind on the wings surfaces create strong forces which the multirotor's motors cannot handle and the aircraft can lose control and even crash. Therefore, in this invention, the wings on those stages of hovering and VTOL are folded to minimize their surface as much as possible and by that reduce the atmospheric wind side effects to minimum, the smaller the surface the better, if we could make the wings to totally disappear at those mode of flights it would have been the best solution.

One of the problems with VTOLs are the moment created by the wind on the wings which effect the VTOL's control, and this is why the wings have to be located in between the motors of the multirotor and as close as possible to the center of gravity and the aerodynamic center, so the motors can create enough momentum to overcome the momentum created by the wings.

A relatively small wing are very easy to fold, but folding a big surface wing can be more difficult since moving the wing above the rotor or below it can affect its thrust and can cause loss of control of the aircraft, other solution is to keep the rotors farther away from each other, but this has a limit too since it add more weight to the aircraft so the motors has to be bigger and the wing has to be bigger and so on. Another problem is that the rotor creates oscillations and the further they are the stiffer has to be the skeleton which holds it.

Since the wings are deployed where there is enough airspeed it might be possible that the wings will be above the rotors with enough space to not disturbs the airflow which is any way for a short time because the wings will create lift and the rotors can be stopped from operating and lock, in an airframe where the rotors surface and the wings are not parallel there is no problem since the rotor thrust is not in the direction of the wings anyway. While flying forward at a certain air speed where the atmospheric wind is relatively low and does not have as big effect on the aircraft as in hover position, the wings are deployed in order to produce lift and save energy.

Multirotor aircraft is stabilized and controlled autonomously by means of sensors and a flight computer that operate its engines and propellers. Thus, for example, if the user wants that the aircraft fly forward, the rear engines receive a command to accelerate and the front rotors receive a command to slow down. This creates the moment that rotates and tilts the craft forward, while the thrust propels it in the horizontal direction. Since some of the energy is required for forward motion, the power of the rotors must be increased in order to maintain the altitude; thus, the aircraft consumes more energy in this state, as depicted in FIGS. 1A and 1B.

FIG. 1A depicts a multirotor craft (500) hovering in a horizontal position. The lift vector (4) is the overall force applied by the motors and rotors or any other vertical thrust created means (300) and the gravity vector (6) is the center of gravity of the aircraft (500). When these two forces are equal in magnitude, the aircraft is in a state of equilibrium i.e. hovering and maintaining its altitude.

Figure 1B:
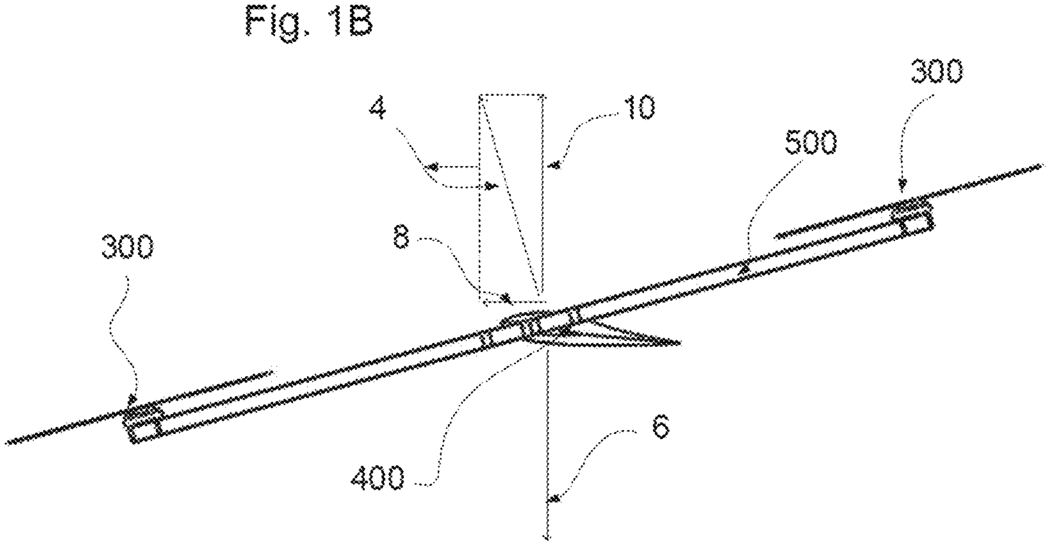
FIG. 1B depicts a multirotor aircraft tilted forward in horizontal flight forward.

FIG. 1B depicts an aircraft (500) tilted forward in horizontal forward flight (or when facing a wind), whereby the lift vector (4) is the resultant force created from the action of the rotors (300) that may be broken down into components so that the forward vector (8) is the component of the resultant force (4) that enables forward movement and vector (10) is the component of the resultant force that determines craft altitude. It can be seen that vector (10) is smaller than both vector (4) and vector (6); hence, in this state the craft will lose altitude and descend. To enable the aircraft to maintain its altitude, the resultant force must be increased until vector (10) is equal to vector (6) i.e. the overall weight of the craft. This will result in equilibrium, enabling the craft to maintain flight altitude. Increasing the resultant force causes waste of energy and shortens flight time.

There are many types of multirotor and many ways to fold wings for example there are fabric wings with tube structures, some are fabric inflated in which the structure becomes strong and solid from the air pressure created a box shape structure. Some structures are stiff telescopic airfoil shape which is one inside the other and can be deployed in the same way as in electric telescopic car antenna.

Those folded winds can be controlled on the roll axis by twisting them with cables controlled by actuators, or by moving the center of gravity by an actuators like done in hang gliders, or by an ailerons in curtain embodiments or it can be control by the multi-rotor's rotors, but then it waist more energy.

The folded wings as described on FIG. 1A and FIG. 1B are attach in an optimal angle in which the multirotor will be while it is flying forward, this angle can be even 90 degrees relative to the ground if lift the wing provides equals the multirotor weight as shown on FIG. 8C.

Figure 2A:
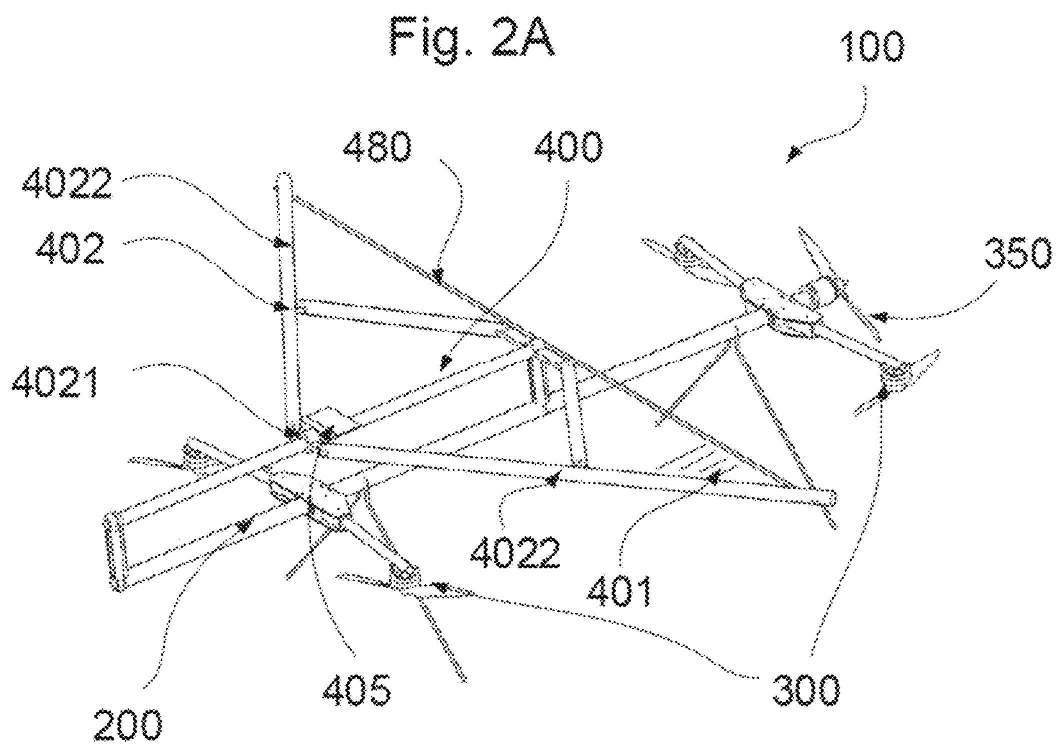
FIG. 2A depicts a multirotor aircraft with four vertical rotors, horizontal rotor and mechanism of two stages folded wings in an unfold position.

One multirotor (100) type is shown on FIG. 2A where it is equipped with a chassis (200) and four rotors (300) attach to it and one pusher rotor (350) attach to it in a perpendicular way any other angle according to the wing or rotor pitch. This type of multirotor control the chassis by using the four or more rotors (300) like any other multirotor, as describes above, during hovering and during VTOL stages, but when forward fast flying is needed, the multirotor stabilize in horizontal position or other constant angle and the pusher motor (350) starts turning and moving the aircraft forward. On this stage after gaining some airspeed the wings (400) are deployed as shown on FIG. 2A and create lift which lifts the multirotor up and the thrust of the rotors (300) can now be lowered in order to keep level altitude and by that saving energy, since the wing has a moment to flip up forward it can be place forward to the center of gravity (c.g.) so the weight of the multirotor back part create negative moment to keep it stabilize. Another way is to attach pitch and rudder stabilizer to the multirotor frame like done on a regular airplanes. When slowing down back to hovering or VTOL position the atmospheric wind becomes again more dominant compare to the multirotor airspeed and the wings (400) has folded again in order to make the multirotor controllable and stable on windy condition.

Since the loose fabric can be a hazard and create drag while folded a spring stipe (404) inside the fabric rolls the wing tail edge and tide it to wing structure.

Figure 3A:
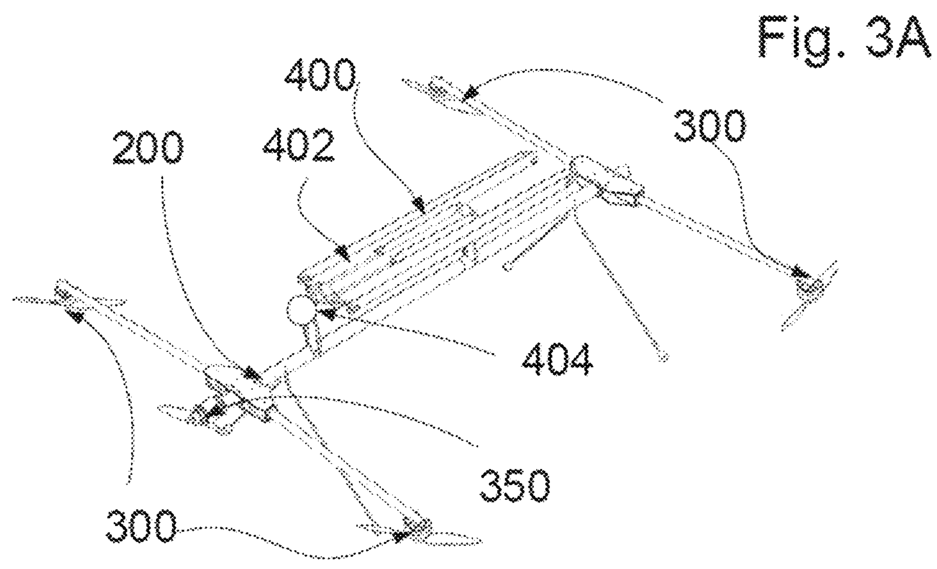
FIG. 3A depicts a multirotor aircraft with four vertical rotors, horizontal rotor and a mechanism of three joints folded wings in an unfold position.

FIG. 3A shown another way of folding wings with 3 joins on each wing, which can be done by radial or linear actuators, by hydraulic or pneumatic pistons, by electric motors turns pulleys and cables, or by an aerodynamic actuator which is actually the airflow force created by the flight forward act on a deployment drag force plate that deployed the wings or on the wings themselves which are specially design so the airflow drag create force which deployed them and a spring force or other elastic force which will folds the wings back when the airspeed is below a certain airspeed, the deployment plate itself can be folded after the deployment in order to reduce the drag its created.

Figure 5A:
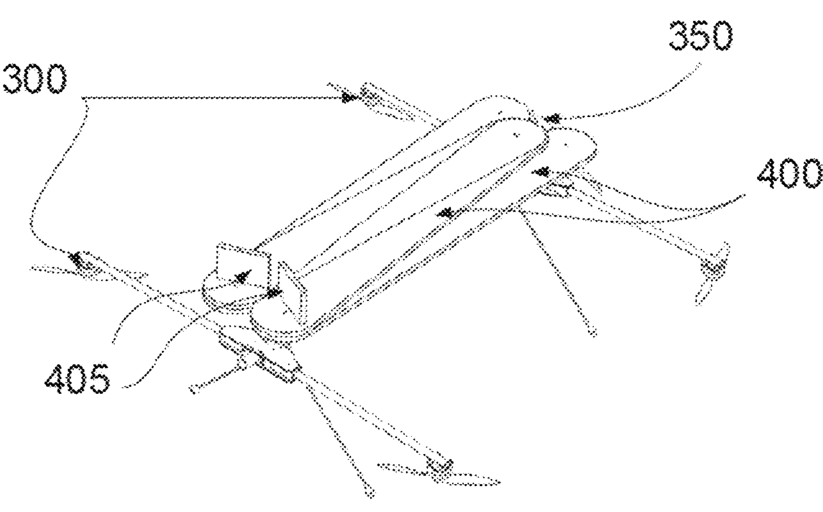
FIG. 5A depicts a multirotor aircraft with four vertical rotors, horizontal rotor and a four wing segments switch-blade folding and an aerodynamic actuator plate in folded position.
Figure 5B:
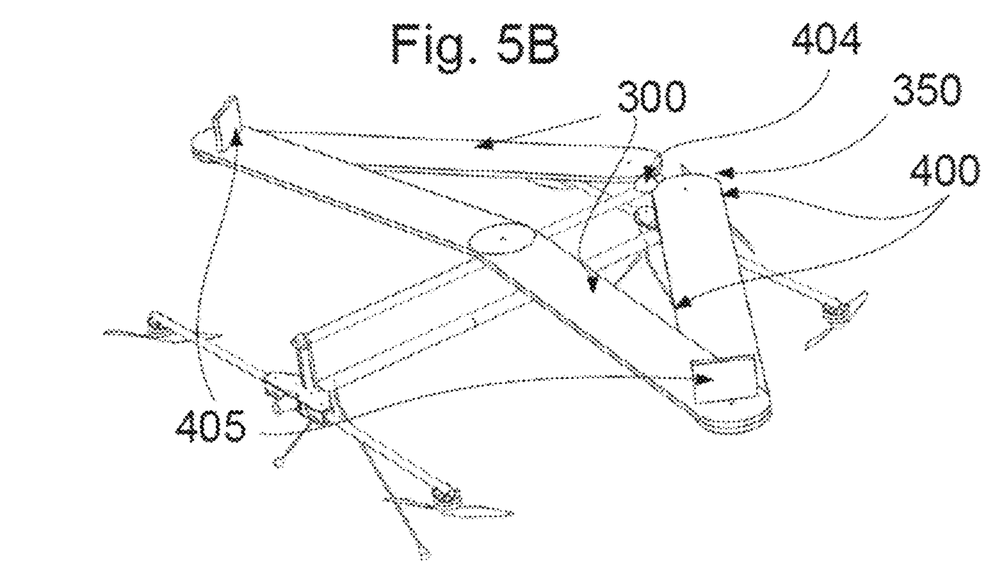
FIG. 5B depicts a multirotor aircraft with four vertical rotors, horizontal rotor and a four wing segments switch-blade folding and an aerodynamic plate actuator in mid deployed stage.
Figure 5C:
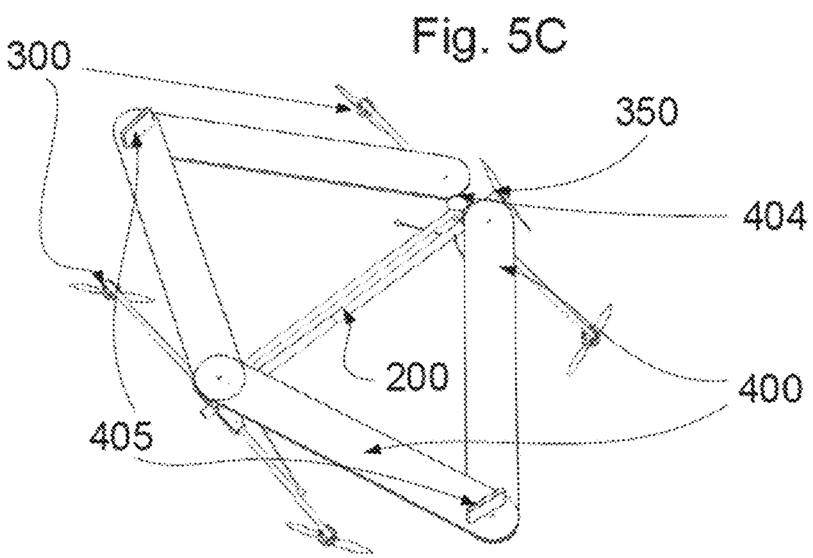
FIG. 5C depicts a multirotor aircraft with four vertical rotors, horizontal rotor and a four wing segments switch-blade folding and an aerodynamic actuator plate in a deployed position.

There are many to design this aerodynamic actuator, one concept example is shown on FIG. 5A-C, where is FIG. 5A shows the scissors folding wings in a folded position where the aerodynamic plate 405 are in a position that deflects the airflow and create a force outside and start to deploy the wings to the second mid stage as shown on FIG. 5B and then to the final deployed position on FIG. 5C which in this stage the aerodynamic plate 405 are in stream line and does not create a big drag force, this design should be backup with springs mechanism to fold it back on a lower speed. The wing fabric might be elastic so there is no need to collect and roll the fabric.

Another way is an inflated wing which can be inflated by an airborne air compressor and deflated by a valve and a spiral spring along the wing to fold it back to prevent the deflated wings from it get into the working rotors.

Figure 4A:
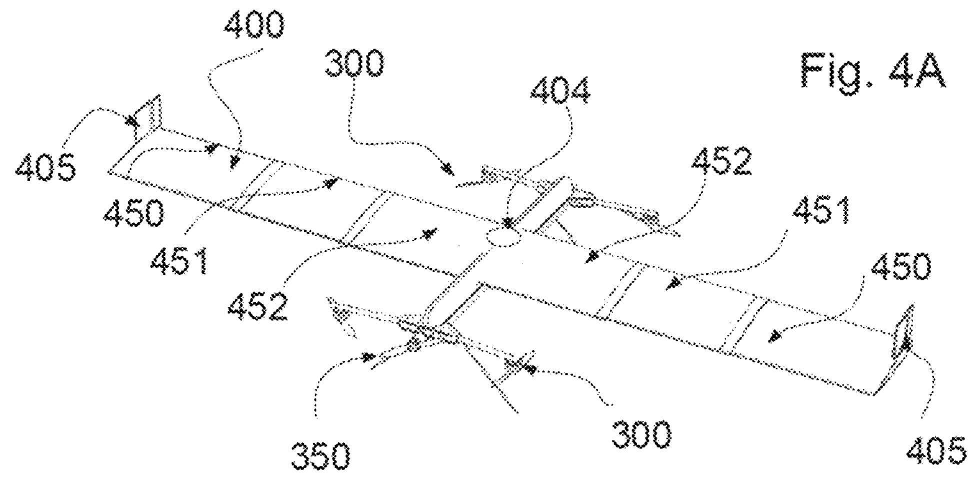
FIG. 4A depicts a multirotor aircraft with four vertical rotors, horizontal rotor and a three parts telescopic deployed wings.
Figure 4B:
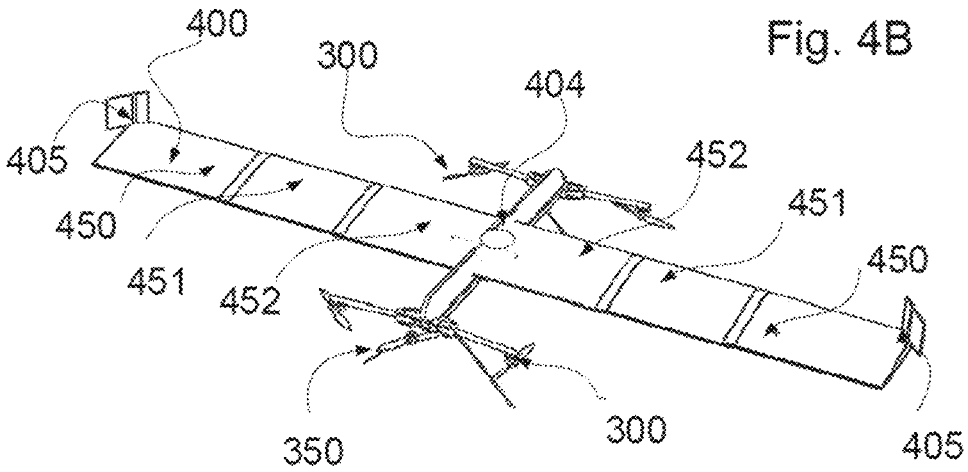
FIG. 4B depicts a multirotor aircraft with four vertical rotors, horizontal rotor and a three parts telescopic deployed wings while aerodynamic actuator plate forces directed outward to deploy the telescopic wings.

Another way of reducing the wings surface as shown on FIG. 4A and FIG. 4B is a telescopic wing which like a mechanism of electric antenna in the car industry it can be deployed as shown on FIG. 4A when wing's segments 450, 4501, 452 are in a deployed state and as shown on FIG. 4B when wing segment 450,451,452 are folded inside the biggest segment 452.

Another way of folding is like done on an accordion when the wing is built from a though skin wing segments where the far end folded 180 degrees upwards on top of the closer segment and both of those segments folded 180 degrees down to the third closest segment and so on until the wing is folded.

In embodiments a four (4) wings that are folded (400) one upon the other, the folding of the wings are configured not only to reduce the wings surface but also to concentrate the aerodynamic center of a wing's surfaces in the center of the multirotor. This allow the motors (350) location to be close to each other since while hovering in windy condition all the parasite aerodynamic force created by the atmospheric wind on the wings surface create a very little moments compare to the huge moments and uncontrollable ones created by the atmospheric wind while the wings deployed. Since the motors are close to each other it created a narrow design which makes the storage of the multirotor smaller and easier. In embodiments, a tandem wings deployed, in this stage the multirotor is in horizontal flight forward stage where the aerodynamic forces created by the airflow are much stronger and directed to the front of the wing compare to atmospheric wind, creates lift and precisely control the aircraft.

Hereinafter we will summarize the above explanations and as shown in the figures, and we can say that the main object of the present invention is to provide a multirotor aircraft (100) that includes a chassis (200), three or more vertical rotors (300), and one or more foldable wing (400). The foldable wing (400) may comprise a wing sheet (401) and foldable wing frame (402). The foldable wing (400) may be designed so that its center of gravity and the aerodynamic center when it is at a folded and closed state are close to the center of gravity to and to the aerodynamic center of the aircraft.

The multirotor aircraft (100) may also include a horizontal rotor (350). The term "vertical rotors" simply means that these rotors are mainly used to create vertical lift, however, they can tilt and provide also horizontal thrust vector. The term "horizontal rotor" simply means that this rotor is mainly used to create horizontal power when the aircraft flies forward, however, it may tilt and also provide vertical thrust vector.

The foldable wing (400) may be deployed and opened when the multirotor aircraft (100) is flying forward and folded and closed when the multirotor aircraft (100) is hovering, landing and during takeoff Thus, it is possible to gain the advantageous of having a wing during flying forward and reducing disadvantageous effects of having a wing when hovering, landing and during takeoff. The foldable wing (400) is folded to reduce its surface as much as possible and by that reduce the atmospheric wind side effects.

The foldable wing (400) may be designed in several structures, preferably according to the specific structure of the multirotor aircraft (100). For example, the foldable wing may be designed as a wing sheet made of fabric attached to a foldable wing frame made of rigid rods or tubes; a foldable wing that may be designed as inflatable fabric wing; a foldable wing that may be designed as a stiff telescopic airfoil shape which is one inside the other and can be deployed in the same way as in electric telescopic car antenna.

The foldable wing (400) may include a means for aerodynamic control (403). Thus, the foldable wing can be aerodynamically controlled by the means for aerodynamic control when the foldable wing is deployed and opened mainly in a horizontal flight. The means for aerodynamic control (403) may be for example an electric actuator that controls the pitch of the foldable wing with ailerons, cables or strings for example, according the same concepts as of as in ultra-light aircrafts, parachutes and airplanes.

The foldable wing (400) may include a means for deploying and folding (404) the foldable wing (400). The means for deploying and folding (404) the foldable wing (400) may be for example radial or linear actuators, hydraulic or pneumatic pistons, electric motors that turn pulleys and cables, an aerodynamic actuator which employs the airflow force created by the forward flight to deploy the foldable wing and to fold it back, springs and the like. It is possible that the multirotor aircraft (100) may include two means (404), or even more, for each wing (400), one for the deployment and one for folding the wing.

FIG. 2A depicts specific embodiment for example of the multirotor aircraft (100) that includes a chassis (200), four vertical rotors (300), a horizontal rotor (350), a foldable wing (400) that comprises a wing sheet (401) (shown in part) and a foldable wing frame (402), and means for deploying and folding (404) the foldable wing. This multirotor aircraft (100) also include a spring (480) that is designed to tight the back side of the wing sheet (401) for minimizing the drag.

The foldable wing frame (402) includes a sliding ring (4021) which is assembled on a central rod of the chassis (200), and several rods (4022) which are connected one to the other by axial connection. The means for deploying and folding (404) the foldable wing (400) is designed to push backward the sliding ring (4021) and as a result the several rods (4022) are deployed as shown in FIG. 2A. The means for deploying and folding (404) the foldable wing (400) is also designed to push forward the sliding ring (4021) and as a result the several rods (4022) are folded as shown in FIG. 2B.

Figure 2B:
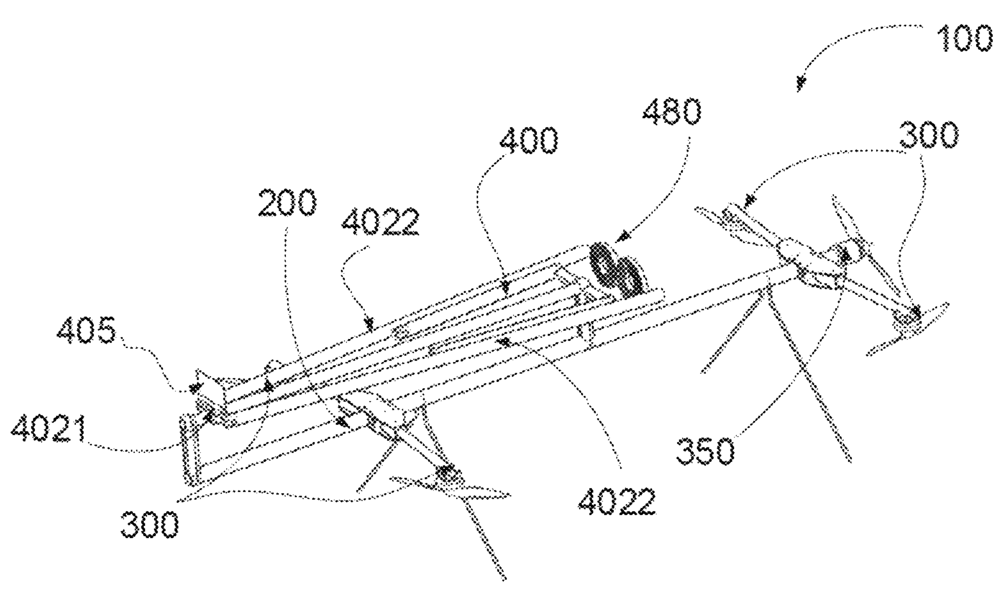
FIG. 2B depicts a multirotor aircraft with four vertical rotors, horizontal rotor and a mechanism of two stages folded wings in a folded position.
Figure 3B:
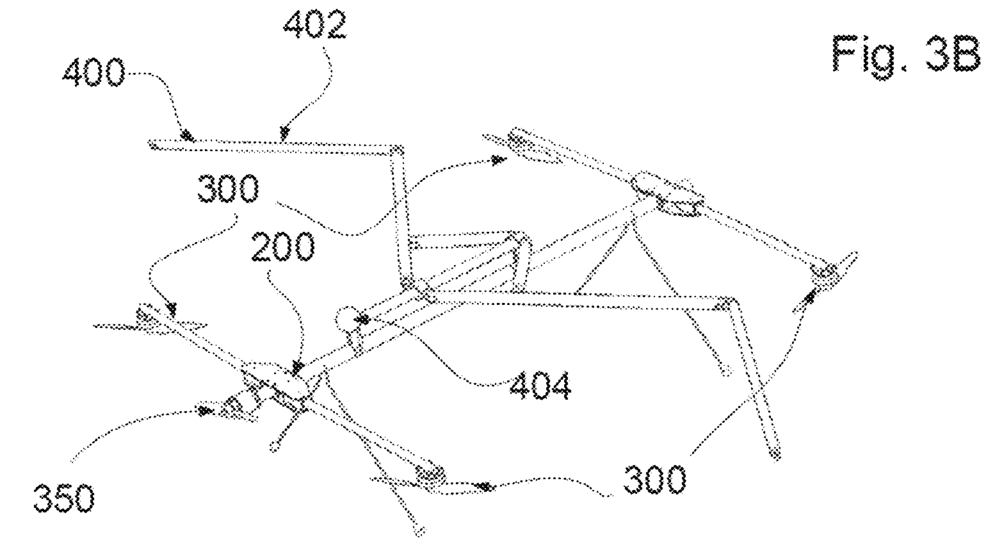
FIG. 3B depicts a multirotor aircraft with four vertical rotors, horizontal rotor and a mechanism of three joints folded wings in a folded position.
Figure 3C:
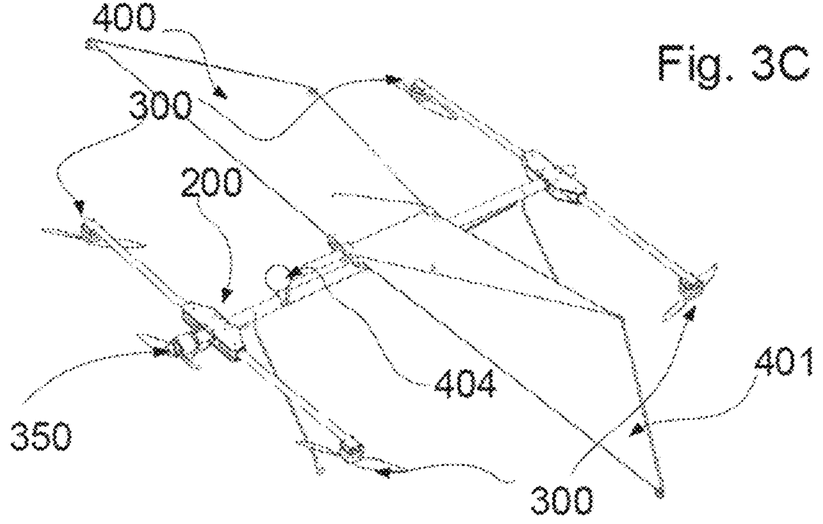
FIG. 3C depicts a multirotor aircraft with four vertical rotors, horizontal rotor and a mechanism of three joints folded wings in a folded position.

FIGS. 3A, 3B and 3C depict another specific embodiment for example of the multirotor aircraft (100) wherein the foldable wing frame (402) has a different structure that on the multirotor aircraft (100) of FIGS. 2A and 2B.

Figure 4C:
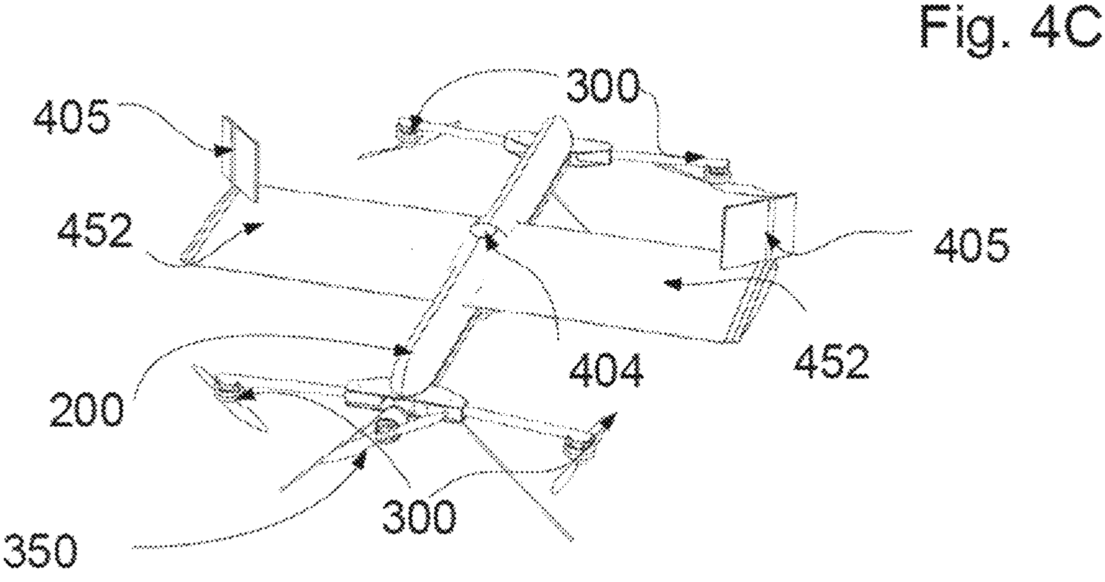
FIG. 4C depicts a multirotor aircraft with four vertical rotors, horizontal rotor and a three parts telescopic folded wings while aerodynamic actuator plate forces directed inward to fold the telescopic wings.

FIGS. 4A-4C depict another specific embodiment for example of the multirotor aircraft (100) that includes a chassis (200), four vertical rotors (300), a horizontal rotor (350), a foldable wing (400) and means for deploying and folding (404) the foldable wing.

The foldable wing (400) in this embodiment as shown in FIGS. 4A-4 C is of the kind of a telescopic wing that is designed to be deployed by the means for deploying and folding (404) the folded wing of a kind of an electro mechanic mechanism like in case of car antenna or of a kind of an aerodynamic plate (405) which needs relatively small amount of electric power of a servo in order to employ aerodynamic forces to deploy or to fold back the foldable wing. FIG. 4A depicts the foldable wing in a deployed state and the aerodynamic plates (405) are in angle that does not create forces outward or inward. FIG. 4B depicts the foldable wing in a deployed state and the aerodynamic plates (405) are in angle that creates forces inwardly toward the center in order to fold the wing segments 450, 451 and 452. In FIG. 4C these segments are in insertion state and inside segment 452 and the aerodynamic plates (405) are in angle that creates forces outwardly of the center in order to deploy the wing segments 450, 451 and 452. The plate (405) has an actuator (not shown) in order to control its angle and it is preferably that it will be folded to a position with minimum drag.

FIGS. 5A-5C depict another specific embodiment for example of the multirotor aircraft (100) that includes a chassis (200), four vertical rotors (300), a horizontal rotor (350), a foldable wing (400) and means for deploying and folding (404) the foldable wing. The foldable wing (400) in this embodiment is designed as a scissors folding wings in a folded position as depicted in FIG. 5A when the means for deploying and folding (404) the foldable wing (400) are of the kind of an aerodynamic plate that are positioned in a way that deflects the airflow and creates a force outside and start to deploy the foldable wing to a second mid stage as shown for example in FIG. 5B, and then to the full deployed position as depicted in FIG. 5C, in which in this stage the aerodynamic plate 404 are in stream line and does not create substantial drag force. This specific design may include a second means for deploying and folding (404) of a kind of a spring mechanism for folding back the wing. The wing sheet may have elastic characteristic to prevent the need to collect and roll the fabric wing sheet.

In embodiments the foldable wing (400) comprise several foldable segments which are connected axially to the chassis (200). These wing segments are designed to be positioned in parallel, one on top of the other, in a folded closed state and these segments are designed to be deployed and opened to an opened state. The wings segments in folded and closed state concentrate in the center of the multirotor.

Figure 6A:
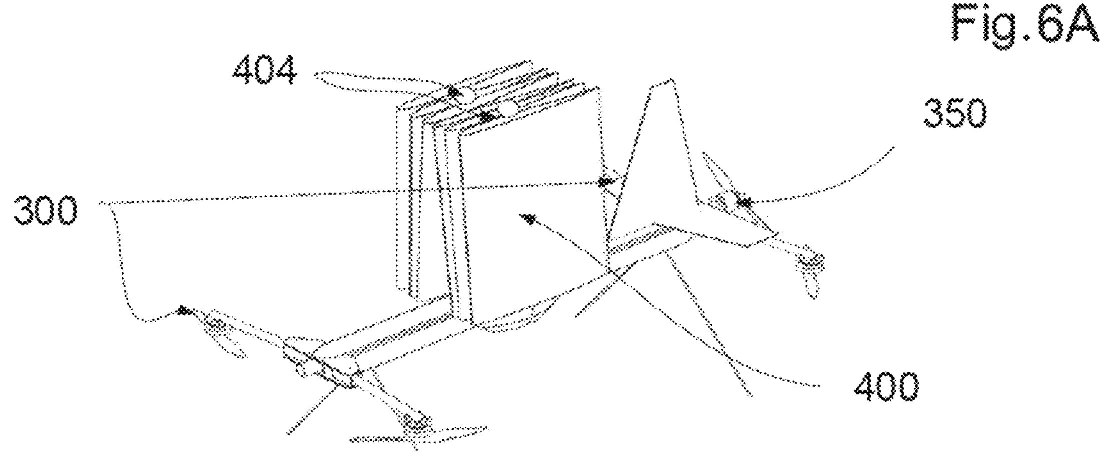
FIG. 6A depicts a multirotor aircraft (100) that its foldable wing (400) comprises several foldable segments 410, 411 and 412 in a folded state.
Figure 6B:
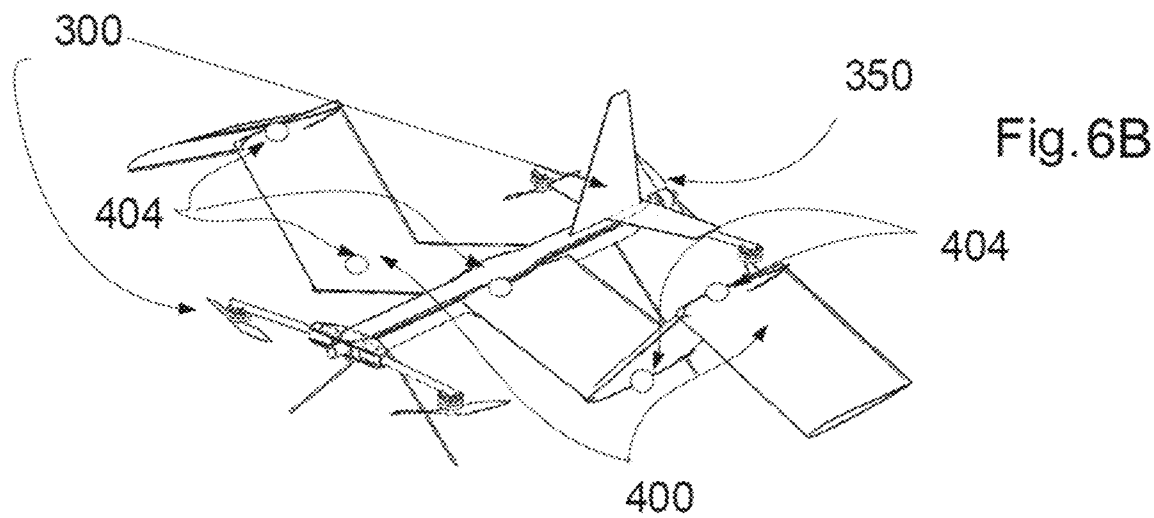
FIG. 6B depicts THE multirotor aircraft (100) of FIG. 7 that its foldable wing (400) is in a partially deployed state.
Figure 6C:
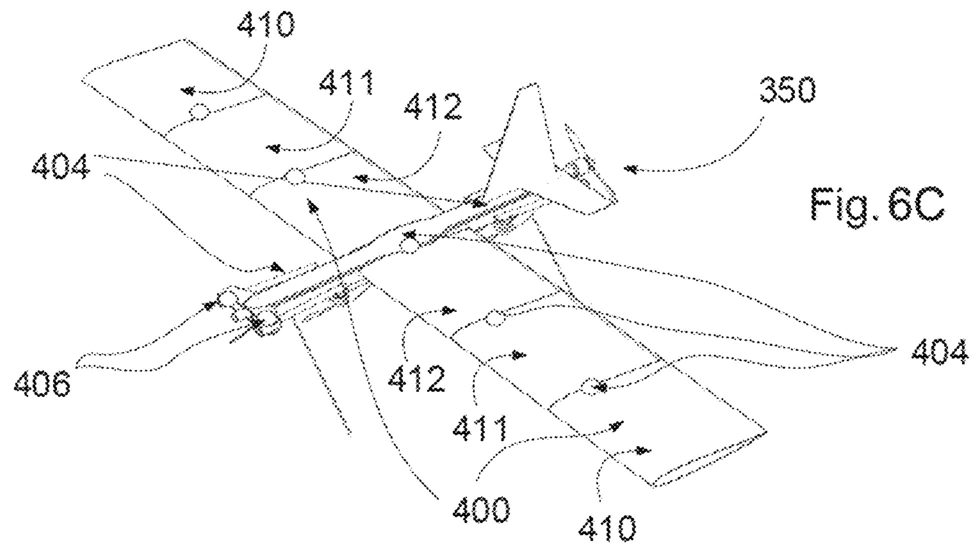
FIG. 6C depicts THE multirotor aircraft (100) of FIG. 7 that its foldable wing (400) is in a deployed state.

FIGS. 6A-6C depict another specific embodiment for example of the multirotor aircraft (100). In this specific embodiment the foldable wing (400) comprises several foldable segments 410, 411 and 412 which are connected axially one to another and they are designed to be folded in parallel one on the other and deployed. When the wings are deployed it is possible to fold the vertical motors (300), by rotors folding means (406), in order to reduce drag and in such mode those vertical rotors are not needed since the aircraft has stabilizers.

Figure 7A:
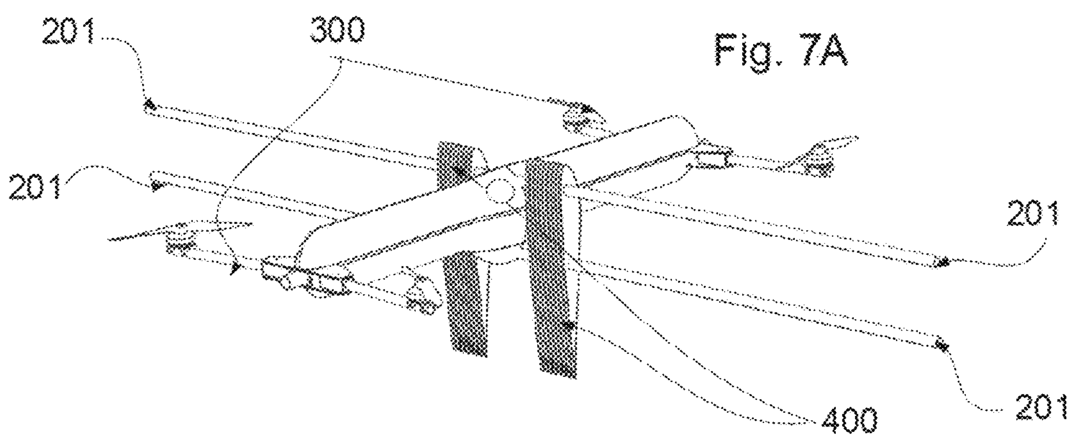
FIG. 7A depicts a multirotor aircraft (100) that its foldable wing (400) several profiles (4023) accordion style in a folded state.
Figure 7B:
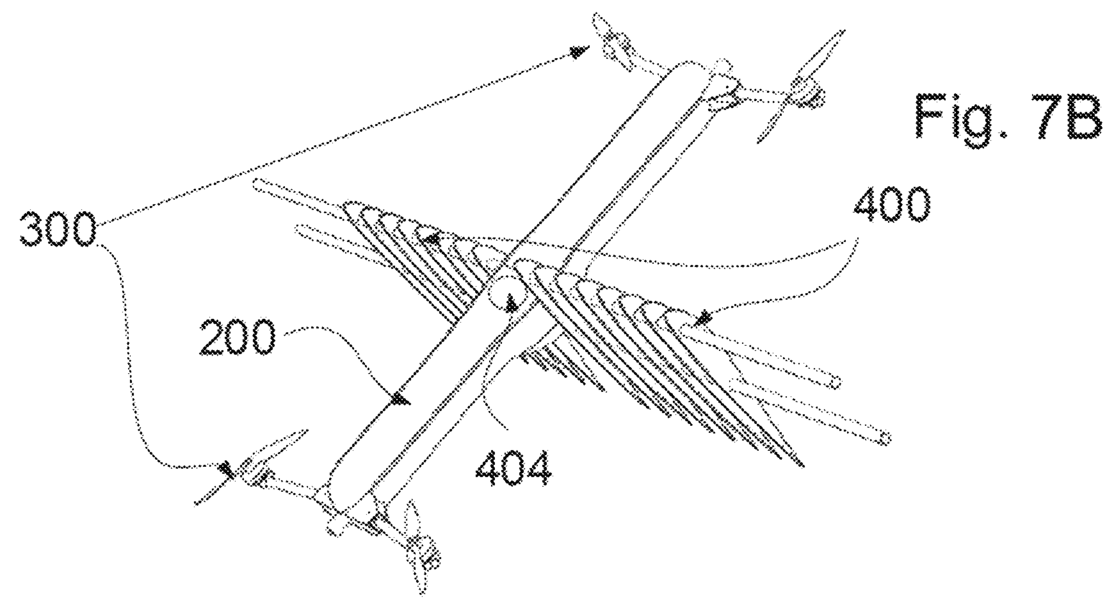
FIG. 7B depicts a multirotor aircraft (100) that its foldable wing (400) several profiles (4023) in a partially folded state.
Figure 7C:
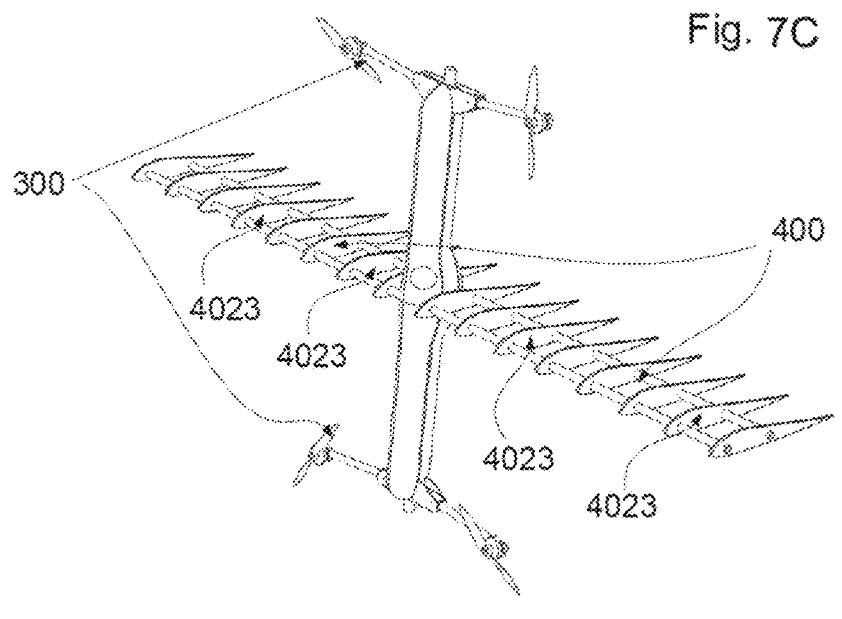
FIG. 7C depicts a multirotor aircraft (100) that its foldable wing (400) several profiles (4023) in a deployed state and fly forward by tilt the thrust and the chassis (200).

FIGS. 7A-7B depict another specific embodiment for example of the multirotor aircraft (100). In this specific embodiment the chassis (200) includes two or more horizontal rods (201) and the foldable wing (400) comprises a foldable wing frame (402) and a wing sheet (401) (not shown in the figure). The foldable wing frame (402) consists of several profiles (4023) which are assembled on the horizontal rods (201) in a way that it is possible to slide them along said rods and by that to bring them closer together as depicted for example in FIG. 7A or to separate them to a deployed position as depicted for example in FIG. 7B.

Another way is an inflated wing which can be inflated by an airborne air compressor and deflated by a valve and a spiral spring along the wing to fold it back to prevent the deflated wings from it get into the working rotors.

What is currently claimed is:

1. A multirotor aircraft comprising:

a chassis, three or more vertical rotors, one or more foldable wings that are attached to the chassis, and a means for deploying and folding said one or more foldable wings that is designed to deploy and open the one or more foldable wings from a folded state to a deployed state, and vice versa; and a. wherein the one or more foldable wings are attached to the chassis in such a way that all parts of the one or more foldable wings are not located under any of the three or more vertical rotors when the one or more foldable wings are in the folded state, in the deployed state and during deployment from the folded state to the deployed state, and wherein each of said one or more foldable wings comprises a wing sheet and a foldable wing frame; and wherein said foldable wing frame is assembled on a central rod of said chassis and comprises at least three rods that are connected one to the other by axial connection; and wherein said at least three rods forming said foldable wing frame are connected one to the other in a "w-like" structure, thereby enabling a wing area to be increased to the sides rather than backwards or forwards; and wherein at least two of said three rods are coupled to said central rod:

1) a first rod of said at least two rods comprising a first end and a second end; wherein the first end is coupled to an end of said central rod; and wherein the second end is coupled along a portion of the length of a second rod of said at least two rods; and 2) wherein a first end of the second rod of said at least two rods is slidingly coupled along the length of said central rod and configured to allow the first end of said second rod to slide along at least a portion of the length of said central rod; and 3) wherein a second end of the second rod is configured to be coupled with an end of a third rod of said at least three rods;

b. wherein the three or more vertical rotors are attached to the chassis in such a way that a part of the three or more vertical rotors is located in front of the one or more foldable wings when they are in the deployed state, and a remaining part of the three or more vertical rotors are located behind the one or more foldable wings; and c. thereby enabling a user to fold and close the one or more foldable wings when hovering, landing and during takeoff, and to deploy and open the one or more foldable wings when flying forward in such a way that the one or more foldable wings do not impair the effectiveness of the three or more vertical rotors.

2. The multirotor aircraft according to claim 1, wherein said central rod comprises a sliding ring.

3. The multirotor aircraft according to claim 2, wherein said sliding ring is configured to slidingly couple said first end of the second rod of said at least two rods along the length of said central rod.

4. The aircraft of claim 2, wherein said sliding ring is controlled with at least one or more selected from the group comprising: radial actuator(s), linear actuator(s), hydraulic piston(s), pneumatic piston(s), electric motors, pulleys and cables, an aerodynamic actuator, airflow force created by the flight, drag force plate, spring force, or elastic force.

5. The multirotor aircraft of claim 2, wherein the one or more foldable wings comprise at least two foldable wings.

6. The multirotor aircraft of claim 5, wherein the at least two foldable wings are configured to be commonly slidingly coupled to said central rod about said sliding ring.

7. The multirotor aircraft of claim 5 wherein, each of said two foldable wings is individually controlled with a with at least one or more selected from the group comprising: radial actuator(s), linear actuator(s), hydraulic piston(s), pneumatic piston(s), electric motors, pulleys and cables, an aerodynamic actuator, airflow force created by the flight, drag force plate, spring force, or elastic force.

8. The multirotor aircraft of claim 1, wherein said foldable wing frame is coupled to a wing sheet made of fabric.

9. The multirotor aircraft of claim 8, wherein said fabric is an inflatable fabric.

10. The multirotor aircraft of claim 9, wherein said inflatable fabric is inflated and/or deflated with at least one selected from: an air compressor or a valve.

11. The multirotor of claim 9, further comprising a spiral spring disposed along the wing frame and provided to fold the inflatable fabric back to prevent a deflated wing from interfering with the working rotors.

12. A multirotor aircraft comprising:

a chassis, three or more vertical rotors, one or more foldable wings that are attached to the chassis, and a means for deploying and folding said one or more foldable wings that is designed to deploy and open the one or more foldable wings from a folded state to a deployed state, and vice versa; and a. wherein the one or more foldable wings and the three or more vertical rotors are connected to the chassis in such a way that an angle between a chord line of the one or more foldable wings when they are in the deployed state and a thrust direction of the three or more vertical rotors is smaller than eighty degrees;

b. thereby enabling a user to deploy and open the one or more foldable wings when flying forward in such a way that substantial force of the three or more vertical rotors can be employed to propel the multirotor aircraft forward while lifting forces of the one or more foldable wings keep the multirotor aircraft in air;

c. wherein each of said one or more foldable wings comprises a wing sheet and a foldable wing frame; and wherein said foldable wing frame is assembled on a central rod of said chassis and comprises at least three rods that are connected one to the other by axial connection; and wherein said at least three rods of said foldable wing frame are connected one to the other in a w-structure, thereby enabling a wing area to be increased to the sides rather than backwards or forwards; and d. wherein at least two of said three rods are coupled to said central rod:

1) a first rod of said at least two rods comprising a first end and a second end; wherein the first end is coupled to an end of said central rod; and wherein the second end is coupled along a portion of the length of a second rod of said at least two rods; and 2) wherein a first end of the second rod of said at least two rods is slidingly coupled along the length of said central rod and configured to allow the first end of said second rod to slide along at least a portion of the length of said central rod; and 3) wherein a second end of the second rod is configured to be coupled with an end of a third rod of said at least three rods.

13. The multirotor aircraft according to claim 12, wherein said central rod comprises a sliding ring.

14. The multirotor aircraft according to claim 13, wherein said sliding ring is configured to slidingly couple said first end of the second rod of said at least two rods along the length of said central rod.

* * * * *